US011985224B2

(12) United States Patent
Zaidi et al.

(10) Patent No.: US 11,985,224 B2
(45) Date of Patent: May 14, 2024

(54) SYSTEMS AND METHODS FOR MULTI-DOMAIN INFORMATION PROCESSING USING AN IMMUTABLE LEDGER

(71) Applicant: Eagle Technology, LLC, Melbourne, FL (US)

(72) Inventors: Waqar Zaidi, Aldie, VA (US); Weston Faber, Colorado Springs, CO (US)

(73) Assignee: EAGLE TECHNOLOGY, LLC, Melbourne, FL (US)

( * ) Notice: Subject to any disclaimer, the term of this patent is extended or adjusted under 35 U.S.C. 154(b) by 3 days.

(21) Appl. No.: 16/995,285

(22) Filed: Aug. 17, 2020

(65) Prior Publication Data

US 2022/0052837 A1 Feb. 17, 2022

(51) Int. Cl.
*H04L 29/06* (2006.01)
*G06F 9/46* (2006.01)
*H04L 9/06* (2006.01)
*H04L 9/00* (2022.01)

(52) U.S. Cl.
CPC ............ *H04L 9/0643* (2013.01); *G06F 9/466* (2013.01); *H04L 9/50* (2022.05)

(58) Field of Classification Search
CPC .......... H04L 9/0643; H04L 9/50; G06F 9/466
See application file for complete search history.

(56) References Cited

U.S. PATENT DOCUMENTS

| 9,906,291 | B1 | 2/2018 | Nakamura et al. | |
|---|---|---|---|---|
| 2019/0018904 | A1* | 1/2019 | Russell | G06F 16/27 |
| 2019/0026425 | A1* | 1/2019 | Downs | G16H 10/40 |

(Continued)

FOREIGN PATENT DOCUMENTS

| AU | 2019201684 | 10/2019 |
|---|---|---|
| WO | 2018170462 | 9/2018 |

OTHER PUBLICATIONS

Esteva et al., "Modeling Data Curation to Scientific Inquiry: A Case Study for Multimodal Data Integration," JCDL '20, Aug. 1-5, 2020, Virtual Event, China, pp. 235-242 (2020).

(Continued)

*Primary Examiner* — Shin-Hon (Eric) Chen
*Assistant Examiner* — Vladimir I Gavrilenko
(74) *Attorney, Agent, or Firm* — Rothschild LLP; Carol Thorstad-Forsyth

(57) ABSTRACT

Systems and methods for multi-domain consensus using an immutable ledger. The methods comprise: receiving, by a First Computing Device ("FCD") of a Data Provider ("DP"), an information request for information from a Second Computing Device ("SCD") of a Data User ("DU") (the information request including a total number of data curations for certain data); communicating a curation request from FCD to a Third Computing Device ("TCD") of a Data Curator ("DC"); receiving, by FCD, a curation result message that indicates whether DC determined that the certain data meets a level of accuracy and precision; determining, by FCD, whether a consensus exists between DP and/or DC(s) that the certain data meets a level of accuracy and precision based on contents of the curation result message(s); and creating a transaction block in the immutable ledger responsive to a determination that a consensus exists.

20 Claims, 11 Drawing Sheets

(56) References Cited

U.S. PATENT DOCUMENTS

| | | | |
|---|---|---|---|
| 2019/0382113 A1* | 12/2019 | Diniz | B64C 39/024 |
| 2020/0105144 A1 | 4/2020 | Bosworth | |
| 2021/0288918 A1* | 9/2021 | Sciancalepore | G06Q 10/00 |

OTHER PUBLICATIONS

Jah, "The Advanced Sciences and Technology Research in Astronautics (ASTRIA): Program Summary," The Univeristy of Texas at Austin, Aerospace Engineering and Engineering Mechanics Cockrell Scool of Engineering, 32 pages (2020).
Jones, "Blockchain in the Space Sector," Center For Space Policy And Strategy, 17 pages (Mar. 2020).
Reed et al., "Blockchain Enabled Space Traffic Awareness (BESTA)—NASA/ADS," available online: <https://ui.adsabs.harvard.edu/abs/2019amos.confE..72R/abstract > 3 pages (2020).
Reed et al., "Blockchain Enabled Space Traffic Awareness (BESTA): Automated Discovery of Anomalous Behavior," 70th International Astronautical Congress (IAC), Washington D.C., United States, Oct. 21-25, 2019 (9 pages).
Sharma, "NASA to use Hyperledger Blcokchain for air traffic management," 2 pages (2019).
Sharma, "NASA to use Hyperledger Blcokchain for air traffic management," available online: <https://www.blockchain-council.org/hyperledger/nasa-to-use-hyperledger-blockchain-for-air-traffic-management/> 6 pages (2019).
Surdi, "Space Situational Awareness through Blockchain Technology," First Int'l. Orbital Debris Conf., 10 pages (2019).

* cited by examiner

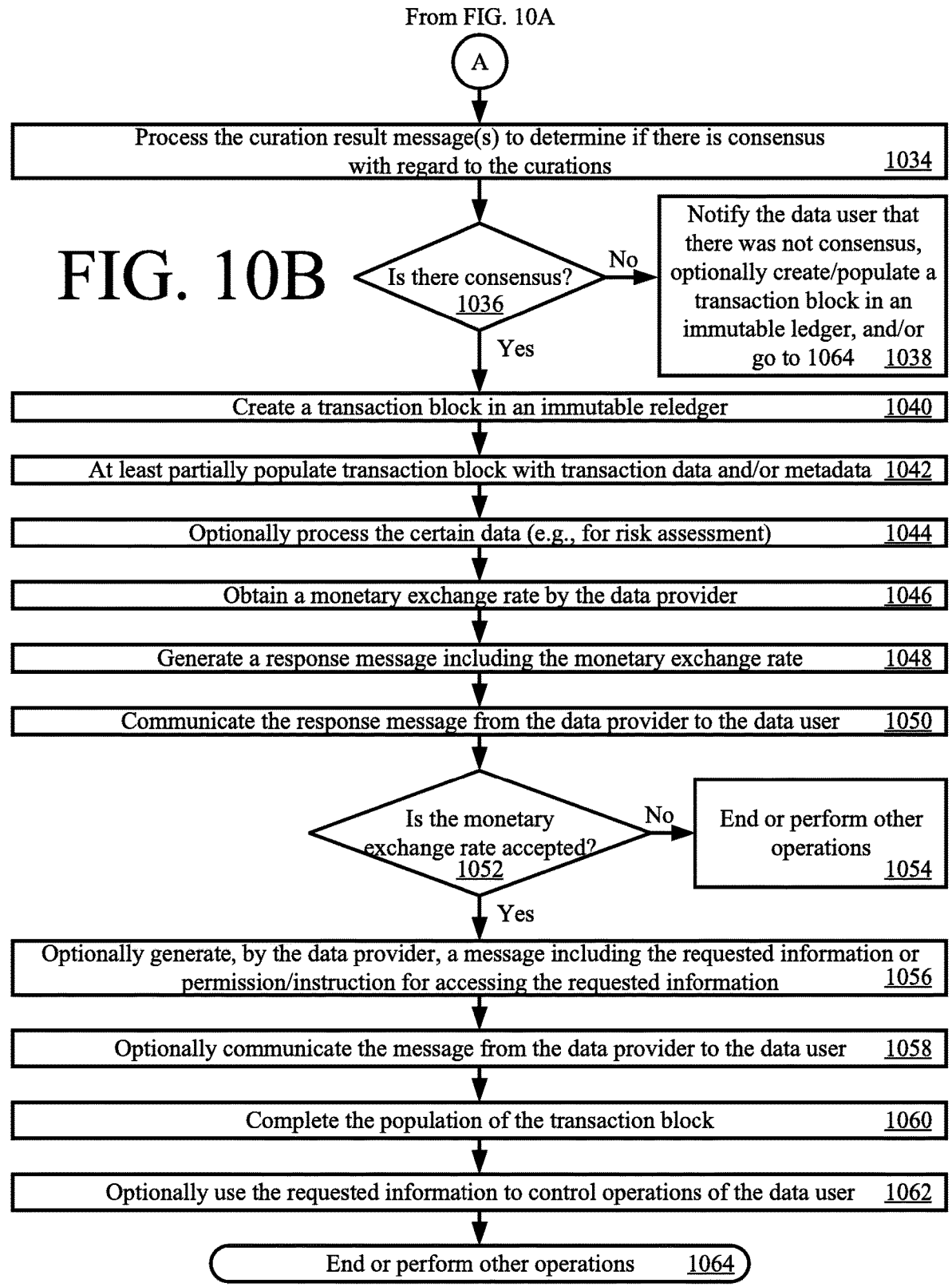

SYSTEMS AND METHODS FOR MULTI-DOMAIN INFORMATION PROCESSING USING AN IMMUTABLE LEDGER

BACKGROUND

Statement of the Technical Field

This disclosure concerns data collection, storage and/or processing systems. More particularly, this disclosure concerns systems and methods for multi-domain (e.g., space traffic, air traffic, and/or geo-spatial intelligence) information processing using an immutable ledger.

Description of the Related Art

Space Traffic Management ("STM") is the planning and coordination of activities that enhance sustainability of operations in the space environment. Space Domain Awareness ("SDA") is the exploitation of intelligence to identify, locate, and track potential threats to on-orbit space systems. Data sharing is critical for SDA which is required for STM. SDA is achieved using sensors to observe objects in space. SDA requires a credible and trusted attribution process to enable a successful deterrence strategy. STM activities require forensics such that the formation of SDA data, that resulted in those activities, is uncorrupted and not called into question.

SUMMARY

This document concerns systems and methods for multi-domain information processing using an immutable ledger. The present solution comprises a novel approach to organizing multi-domain data requests onto an immutable ledger such that, once consensus is established, transactions related to a request, its corresponding data provision(s), and their corresponding data curation(s) are captured on a transaction block. Data users, data providers, and data curators are expected, but not required, to be decentralized participants as long as independence of data provision and data curation is maintained. Accordingly, the methods comprise receiving, by a first computing device of a data provider, an information request for information from a second computing device of a data user. This information may be associated with a given object. The information request includes a total number of data curations for certain data. The first computing device communicates a curation request to a third computing device of at least one data curator. The data curator comprises an entity independent from the data provider. The first computing device receives a curation result message from the third computing device. The curation result message indicates whether the data curator determines that the certain data meets a level of accuracy and precision. The level of accuracy and precision may be set by the data user. The contents of the curation result message are used to determine whether a consensus exists between the data provider and/or one or more data curators such that the certain data meets a level of accuracy and precision. In response to a determination that a consensus exists, a transaction block is stored on the immutable ledger. The data user may also be provided access to the curated data. The immutable ledger may be shared at once by permissioned data users, data providers, and/or data curators.

The immutable ledger comprises a plurality of transaction blocks linked to each other. The transaction blocks may provide records of prior transactions between a plurality of data users, a plurality of data providers and a plurality of data curators. The transaction block is populated with: block data for a transaction between the first and second computing devices that is associated with the information request and a response to the information request; block data for a transaction between the first computing device and the third computing device that is associated with the curation request and the curation result message; data identifying (but not limited to) a space domain, an airspace domain or a geo-spatial intelligence domain; a hash for a previous transaction block; a hash for the certain data; and/or a hash of results from intelligence exploited from the certain data (e.g., results of a risk assessment).

In some scenarios, the methods also comprise selecting a monetary exchange rate between the first and second computing devices. The monetary exchange rate may be selected based on whether or not the consensus exists, the type of information being requested, a classification level of the information being requested, and/or exchange rates currently being offered by other data providers for information which is the same or similar to the information being requested. The first computing device may receive a message from the second computing device that the data user accepts the monetary exchange rate. The transaction block may be populated with the monetary exchange rate for accessing the information being requested by the data user.

In those or other scenarios, the methods further comprise: performing curation operations between the first computing device of the data provider and the third computing device of the data curator to determine that the certain data meets a level of accuracy and precision prior to storage of the certain data in a second data store; and/or using the information associated with the given object to cause the data user to exercise command and control of a vehicle or vessel (e.g., to cause a vehicle or vessel to maneuver to avoid a collision with a given object). The first and second data stores may comprise the same data store or different data stores.

BRIEF DESCRIPTION OF THE DRAWINGS

This disclosure is facilitated by reference to the following drawing figures, in which like numerals represent like items throughout the figures.

FIGS. 10A-10B (collectively referred to as "FIG. 10") provide a flow diagram of an illustrative method for multi-domain (e.g., a space traffic domain, an air traffic domain, and/or a geo-spatial intelligence domain) information processing using an immutable ledger.

DETAILED DESCRIPTION

Figure 1:
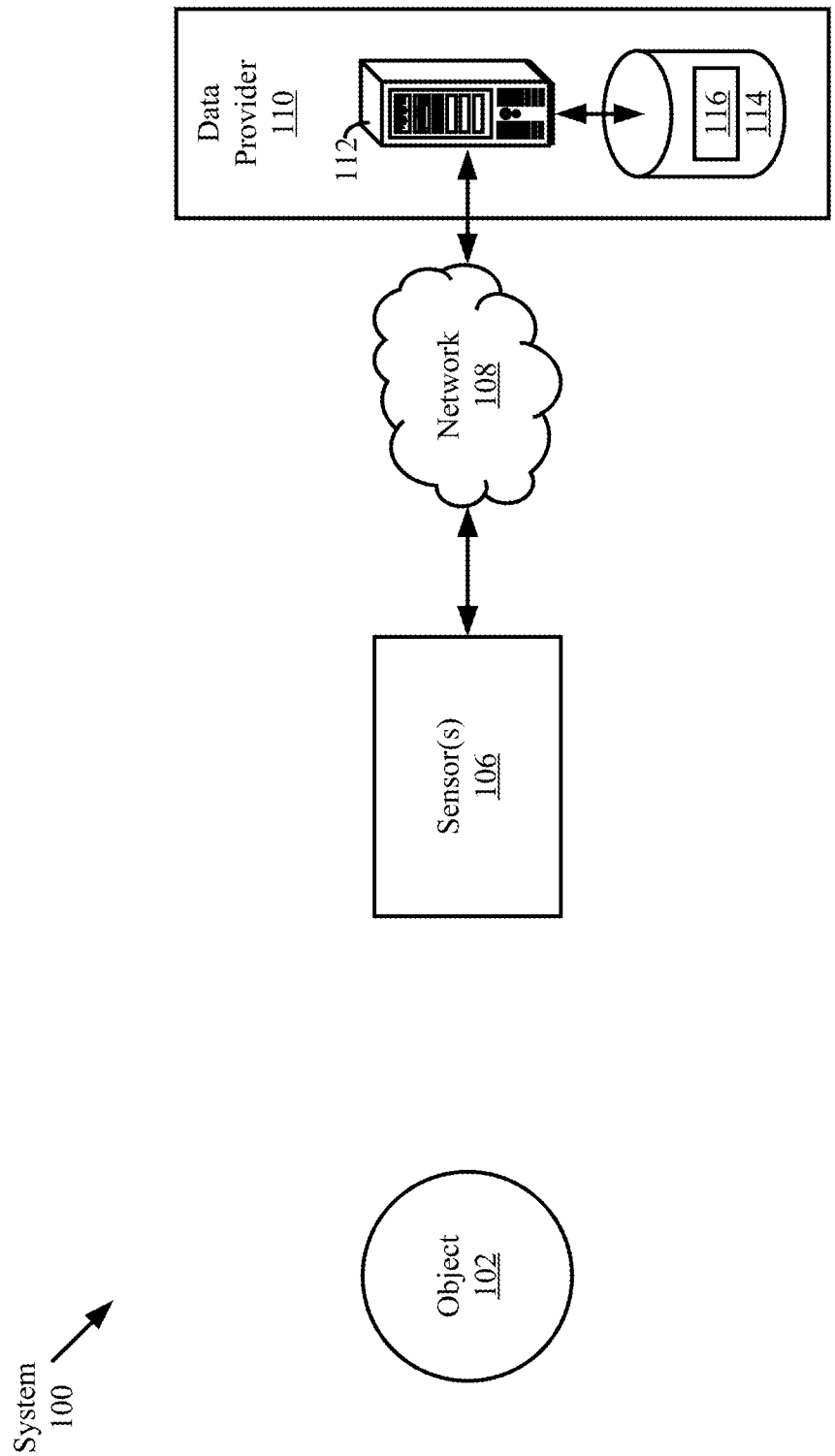
FIG. 1 provides an illustration of an illustrative system.

It will be readily understood that the solution described herein and illustrated in the appended figures could involve a wide variety of different configurations. Thus, the following more detailed description, as represented in the figures, is not intended to limit the scope of the present disclosure but is merely representative of certain implementations in various different scenarios. While the various aspects are presented in the drawings, the drawings are not necessarily drawn to scale unless specifically indicated.

Reference throughout this specification to features, advantages, or similar language does not imply that all of the features and advantages that may be realized should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

STM is the planning and coordination of activities that enhance sustainability of operations in the space environment. SDA is the exploitation of intelligence to identify, locate, and track potential threats to on-orbit space systems. Data sharing is critical for SDA which is required for STM. SDA is achieved using sensors to observe objects in space. The sensors include, but are not limited to, cameras, heat sensors, motion sensors, beam break sensors, and/or radar systems. SDA requires a credible and trusted attribution process to enable a successful deterrence strategy. STM activities require forensics such that the formation of SDA data, that resulted in those activities, is uncorrupted and not called into question.

The present solution provides an immutable ledger. The immutable ledger records transactions between systems and methods that include any hardware and software developed from the exploitation of scientific knowledge. The immutable ledger is generally configured to record transaction blocks that comprise, but are not limited to, (i) data provision transactions between data users and data providers that are associated with the respective requests and (ii) data curation transactions between the data providers and data curators that are also associated with the respective requests. Data curations require the four V's. The four V's include veracity (i.e., a combination of metrics that indicate whether data meets a required level of accuracy and precision), variety (i.e., a plurality of types of technologies generating the data), volume (i.e., a relatively large amount of data collected at a short cadence), and/or velocity (i.e., the amount of time between a data request and data reception). Thus, a curation may involve determining that the given data meets a level of accuracy and precision. The level of accuracy and precision may be set by the data user. The curation is achieved in accordance with a consensus protocol that allows a request, and the response to the request, to be executed within an operational timeline specific to the domain in which the request is made (e.g., aircraft flight time from departure to arrival; the time it takes to assess, plan, and execute an evasive spacecraft maneuver; or the time it takes to assess military intelligence and plan and execute a counterattack). A combination of data curators coming to a consensus is expected to, but not necessarily, remove bias from the requested data. Transactions associated with the requests for and/or curations of data are logged in a novel immutable ledger that is maintained across several computers that are linked in a network. Logging transaction blocks on an immutable ledger enables forensics for an action performed in response to the exploitation of the requested data. The present solution provides a less resource and computationally intensive solution for determining data (by providing the option to use machine-to-machine interfaces) as compared to conventional solutions (e.g., solutions where bulk data is provided to centralized data users and iteratively filtered by hand).

The present solution can be used in a variety of applications. Such applications include, but are not limited to, autonomous vehicle command and control applications (e.g., autonomous and/or tele-operated), operations management applications (e.g., air traffic control), and/or military applications (e.g., troop deployment based on curated intelligence). The present solution will be described below in relation to a vehicle application simply for ease of explanation. The present solution is not limited in this regard.

Illustrative System(s)

Referring now to FIG. 1, there is provided an illustration of an illustrative system 100 that is useful for understanding the present solution. The present solution is described herein in relation to sensor data applications. The present solution is not limited in this regard. The present solution can be used in applications where sensors are not used to generate sensor data.

System 100 comprises an object 102 that resides either (i) in space, air or sea or (ii) on land. The object 102 can include, but is not limited to, a satellite, an asteroid, a vehicle (e.g., a car, a truck, a motorcycle, a plane, a boat, a submarine, a spacecraft), a space station, a building, a person, and/or an animal (e.g., a bird). One or more sensors 106 are provided to facilitate object detection and tracking. In this regard, the sensor(s) 106 is(are) configured to generate sensor data including information observed about the object. The observed or observation information can indicate, for example, a type of object, a physical state of the object, an operational state of the object, a location of the object, a direction of travel of the object, a path of travel of the object, a speed of the object, and/or other particulars of the object. The sensors can include, but are not limited to, camera(s), radar system(s), sonar system(s), satellite laser ranging data, optical data, LiDAR system(s), beam brake sensor(s), proximity sensor(s), motion sensor(s), and/or heat sensor(s). Each of the listed sensors is well known in the art.

The sensor data is communicated from the sensor(s) 106 to a data provider 110 via a network 108 (e.g., a cellular network, Internet, Intranet, satellite communications network, etc.). The data provider 110 includes a computing device 112 (e.g., a server) and a data store 114 (e.g., a database). The computing device 112 is configured to receive and process the sensor data, and record its level of accuracy and precision. In some scenarios, this computing device determines if the sensor data is associated with a given object to within a certain level of accuracy and precision. The determination is achieved in accordance with, for example, an estimation technique, a Bayesian filtering technique, and/or a machine learning technique. Each of the listed techniques is well known in the art. The sensor data is stored in the data store 114 when a successful collection of that data occurs, as shown by block 116.

Figure 2:
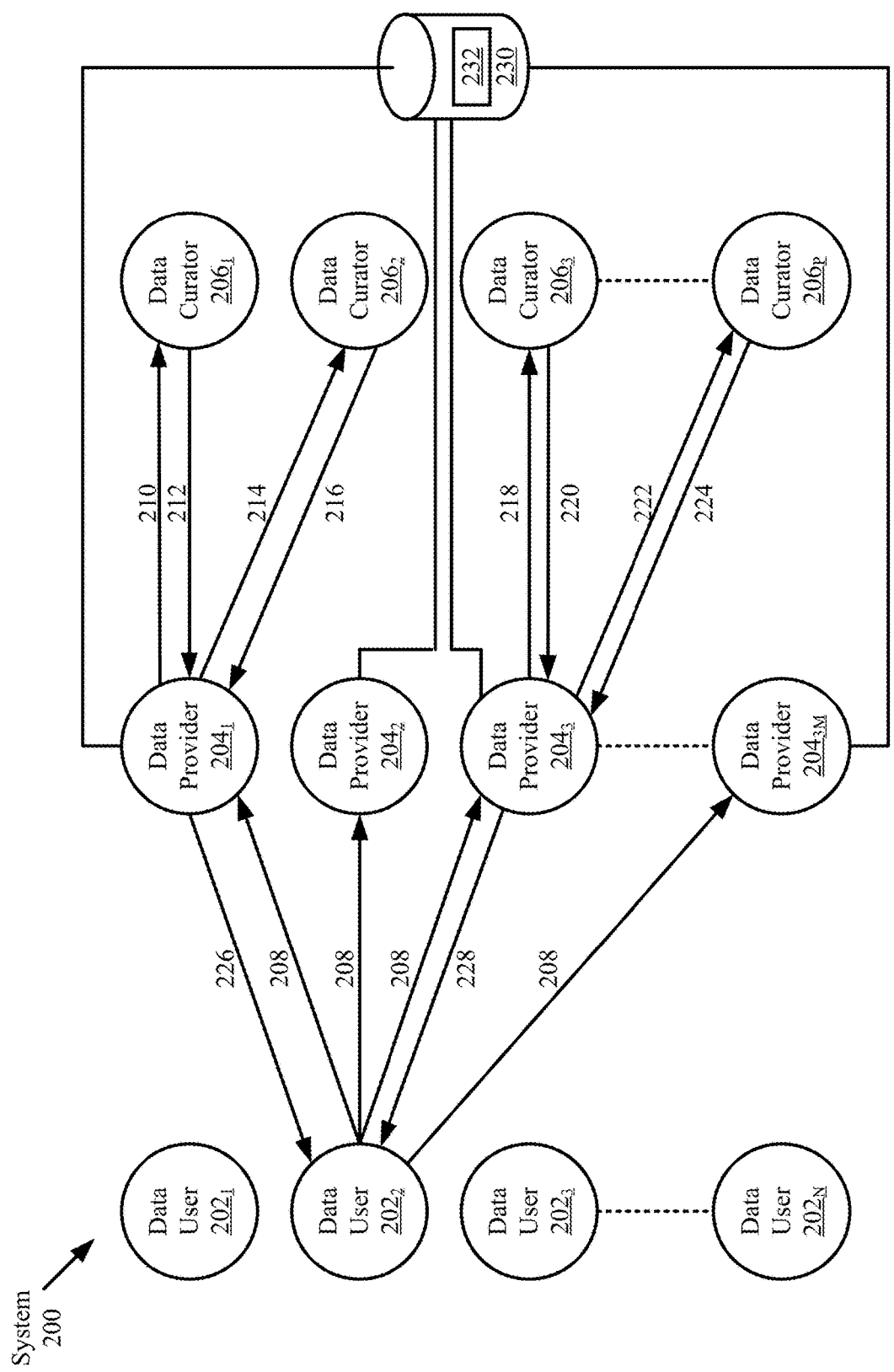
FIG. 2 provides an illustration of another illustrative system
Figure 5:
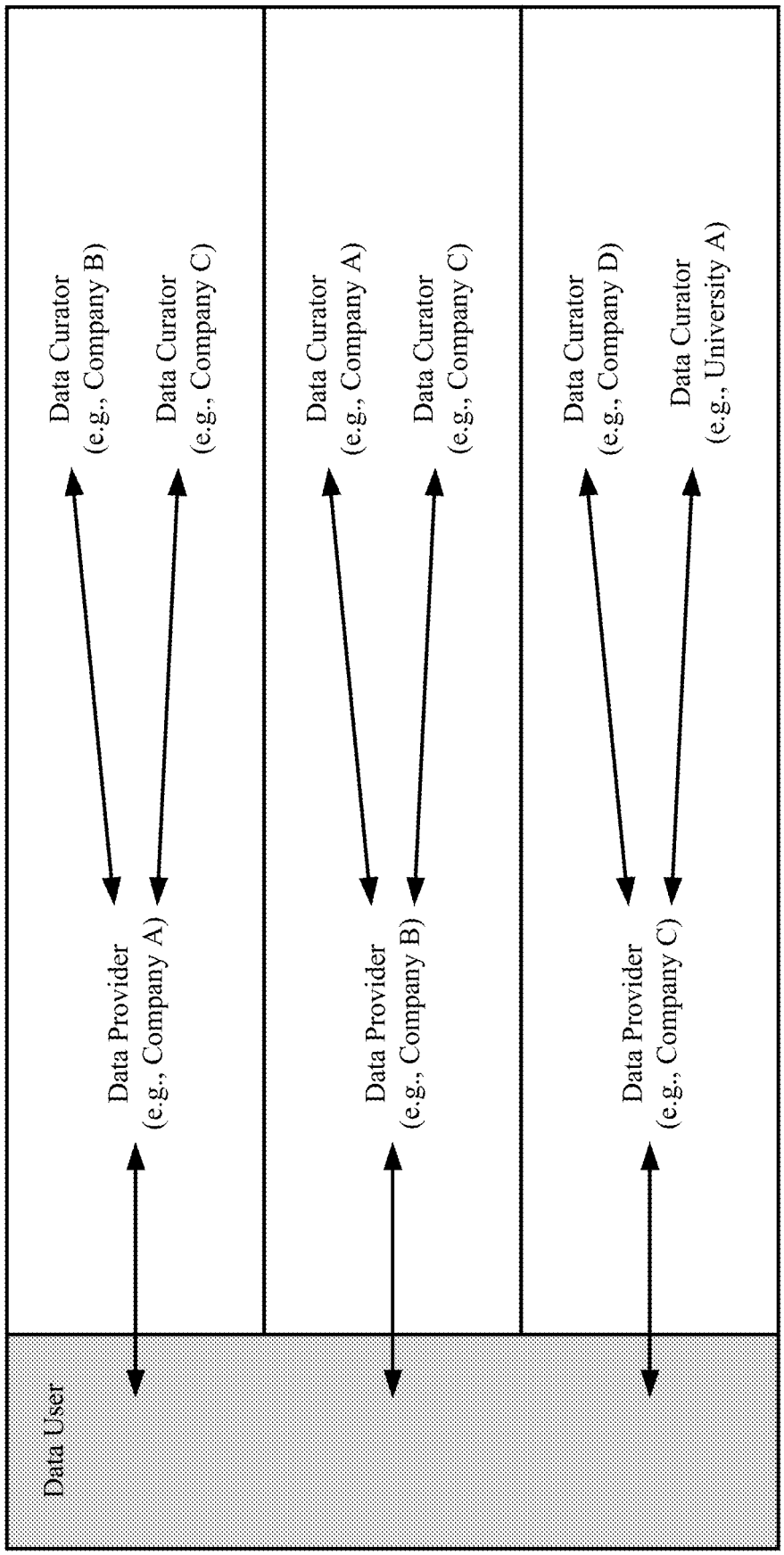
FIG. 5 provides an illustration of interactions between data user, data providers, and data curators that is useful for understanding the present solution.

Referring now to FIG. 2, there is provided an illustration of an illustrative system 200 implementing the present solution. System 200 comprises a plurality of data users $202_1$, $202_2$, $202_3$, ..., $202_N$, a plurality of data providers $204_1$, $204_2$, $204_3$, ..., $204_M$, and a plurality of data curators $206_1$, $206_2$, $206_3$, ..., $206_P$. Each of the data providers $204_1$, $204_2$, $204_3$, ..., $204_M$ may be similar to the data provider 110 of FIG. 1. In this regard, each data provider $204_1$, $204_2$, $204_3$, ..., $204_M$ comprises a computing device (e.g., computing device 112 of FIG. 1) that is generally configured to receive, curate and/or store data in a data store (e.g., data store 114 of FIG. 1). The data may be stored so as to be associated with one or more objects (e.g., object 102 of FIG. 1). The data curators $206_1$, $206_2$, $206_3$, ..., $206_P$ comprise entities that are independent from, separate from and/or disparate than the data providers $204_1$, $204_2$, $204_3$, ..., $204_M$. For example, data provider $204_1$ comprises company A, while data curator $206_1$ comprises company B and data curator $206_2$ comprises university A. The present solution is not limited to the particulars of this example. In other scenarios, the same company can act as both a data provider and a data curator, as shown in FIG. 5.

Each data user $202_1$, $202_2$, $202_3$, ..., $202_N$ may include, but is not limited to, a vehicle (e.g., an autonomous vehicle/vessel and/or a tele-operated vehicle/vessel), and/or a computing device of an entity (e.g., a private company, a university, and/or government agency). Each data user $202_1$, $202_2$, $202_3$, ..., $202_N$ is configured to generate and communicate a request 208 for information associated with a given object to the data providers $204_1$, $204_2$, $204_3$, ..., $204_M$. The request 208 identifies the information that is being requested, identifies the given object, specifies a total number of curations that are to performed in relation to certain data associated with the identified information (e.g., three curations), a format of the data/information, and/or indicates whether the data user is willing to accept curated and/or un-curated data/information. The requested information can include, but is not limited to, an estimate of the state of an object that meets a level of accuracy and precision, observation based information (e.g., sensor data indicating observed movement of the object), and/or results from assessing sensor data (e.g., results of risk assessments for collisions, damage or other events). A curation involves determining that given information (e.g., sensor data) meets a level of accuracy and precision. The level of accuracy and precision may be set by the data user. For example, the request 208 specifies that the requested information is to be curated by three (3) data curators. If at least two of the three data curators determine that the given information meets a level of accuracy and precision, then the curation meets a desired degree or level of confidence. The present solution is not limited to the particulars of this example.

In response to the request, one or more data providers accepts the request and performs operations responsive thereto. These operations include, but are not limited to: communicating a request to one or more data curators for curating the information which was requested by the data user; receiving responses from the data curators indicating results of the curation operations (i.e., whether the information was or was not curated by the data curator, and/or the level of accuracy and precision that the information was or was not associated with the object); processing the responses to determine whether all or a threshold number of the data curators determined that the information meets a level of accuracy and precision; and/or sending a response message to the data user indicating whether or not there was a consensus amongst itself and/or the data curators that the information meets a level of accuracy and precision. The response message may also include the requested information, permission/authorization to download or otherwise access the requested information from a data store (e.g., data store 114 of FIG. 1), instructions for accessing the requested information, and/or results from processing the requested information (e.g., commands for controlling operations of the object (e.g., commands for causing an autonomous or tele-operated vehicle/vessel to perform a maneuver)).

For example, as shown in FIG. 2, a data user $202_2$ sends a request 208 for information associated with a given object to the data providers $204_1$, $204_2$, $204_3$, ..., $204_M$. For example, the data user requests information about a given object (e.g., a current location of the object, a physical state of the object, a size of the object, an operational state of the object, a speed of the object, a path of travel of the object, etc.), observation data about all objects located between two longitudinal coordinates, or results of a collision risk assessment with an object located within a given space in front of, in back of, to the side of, and/or adjacent to the data user. The present solution is not limited to the particulars of this example.

Some or all of the data providers can accept or reject the request. For example, data providers $204_1$ and $204_3$ accept the request 208, while data providers $204_2$ and $204_M$ reject the request 208 (e.g., because they do not have the requested information associated with the given object). The present solution is not limited to the particulars of this example.

In response to the accepted request 208, data provider $204_2$ retrieves data from a data store (e.g., data store 114 of FIG. 1), communicates a curation request 210 to data curator $206_1$, and/or communicates a curation request 214 to data curator $206_2$. The curation requests 210, 214 includes the data that is to be curated, or permission/instructions how to access the same. The curation requests 210, 214 can be in the same or different format depending on the requirements of the data curators $206_1$, $206_2$.

In response to the curation requests, the data curators $206_1$ and $206_2$ perform curation operations to determine that the requested information meets a level of accuracy and precision. Notably, each data curator can perform the same or different technique for curating the requested information as the other data curator and/or as that used by the data provider prior to storing the information in the data store (e.g., data store 114 of FIG. 1). These curation techniques can include, but are not limited to, an estimation technique, a Bayesian filtering technique, and/or a machine learning technique.

Upon completing the curation operations, each data curator may optionally condition the data for usability, and/or send a curation result message 212, 216 to the data provider $204_1$. The curation result message 212, 216 may include a level of accuracy and precision value that the information is associated with the given object. The data provider $204_1$ processes the curation result messages 212, 216 to determine whether at least one of the data curators determined that the information meets a level of accuracy and precision.

If so, the data provider $204_1$ generates and sends a response message 226 to the data user $202_2$. The response message 226 indicates whether or not there is a consensus amongst itself and/or the data curator(s) $206_1$, $206_2$ that the information meets a level of accuracy and precision.

The response message 226 may also include a monetary exchange rate or price for accessing the requested information. The monetary exchange rate or price may be dynamically determined, selected or computed by the data provider $204_1$ based on (a) whether or not there was a consensus, (b) the type of data being requested, (c) a classification level of the data being requested (e.g., top secret, classified, unclassified, sensitive, public, etc.), and/or (d) the exchange rates currently being offered by other data providers for the same or similar information. For example, a first monetary exchange rate (e.g., 0.05) is selected when there is a consensus, and a second different monetary exchange rate (e.g., 0.01) is selected when there is not a consensus. The present solution is not limited to the particulars of this example.

In some scenarios, a monetary exchange rate is pre-agreed upon by the data user and the data provider. If the monetary exchange rate selected by the data provider is equal to or less than the previously agreed upon monetary exchange rate, then the response message 226 may also include the requested information, authorization to download or otherwise access the requested information from a data store (e.g., data store 114 of FIG. 1), and/or results from processing the requested information (e.g., commands for controlling operations of the object (e.g., an autonomous or tele-operated vehicle/vessel)). In contrast, if the monetary exchange rate selected by the data provider is greater than the previously agreed upon monetary exchange rate or there was never an agreement with regard to the monetary exchange rate, then the data provider $204_1$ waits for an acceptance of the monetary exchange rate from the data user $202_1$. Upon acceptance of the monetary exchange rate, the data provider $204_1$ sends another response message that includes the requested information, authorization/instructions how to download the requested information from a data store (e.g., data store 114 of FIG. 1), and/or results from processing the requested information (e.g., commands for controlling operations of the object (e.g., an autonomous or tele-operated vehicle)).

Similarly in response to the request 208, data provider $204_3$ communicates a curation request 218 to data curator $206_3$ and communicates a curation request 222 to data curator $206_P$. The curation requests 218, 222 include the requested data that is to be curated. Although the data provider $204_3$ is shown in FIG. 2 as using different data curators $206_3$, $206_P$ than the data curators $206_1$, $206_2$ used by data provider $204_1$, the present solution is not limited in this regard. The data providers can use at least one of the same data curators for curating information, as shown in FIG. 5.

In response to the curation requests, the data curators $206_3$ and $206_P$ perform curation operations to determine that the requested meets a level of accuracy and precision. In some scenarios, the data curators determine that the requested information is associated with the given object within a certain level of accuracy and precision. Upon completing the curation operations, each data curator may optionally condition the data for usability, and/or send a curation result message 220, 224 to the data provider $204_3$. The data provider $204_3$ processes the curation result messages 220, 224 to determine whether at least one of the data curators determined that the information meets a level of accuracy and precision. If so, the data provider $204_3$ generates and sends a response message 228 to the data user $202_2$. The response message 228 indicates whether or not there is a consensus amongst itself and/or at least one of the data curators $206_3$, $206_P$ that the information meets a level of accuracy and precision. The response message 228 may also include the requested information, authorization to download the requested information from a data store (e.g., data store 114 of FIG. 1), and/or results from processing the requested information (e.g., commands for controlling operations of the object (e.g., an autonomous or tele-operated vehicle/vessel)).

Notably, the transactions associated with the request 208 are logged in a novel immutable ledger 232 of a data store 230 that is maintained across several computers that are linked in a network as shown in FIG. 2. The logging of transactions can be triggered by: (1) a determination that there is a consensus amongst a data provider and/or the data curator(s) that the information meets a level of accuracy and precision; and/or (2) a data user's acceptance of an exchange rate. In some scenarios, the logging of transactions is also triggered by: (1) a determination that there is not a consensus amongst a data provider and/or the data curator(s) that the information meets a level of accuracy and precision; and/or (2) a data user's rejection of an exchange rate.

In some scenarios, transactions may be logged onto the immutable ledger 232 when (i) a data user does not receive a response to a request for information from a data provider and/or (ii) a determination is made by a data provider that there is not a consensus amongst a data provider and/or the data curator(s). The immutable ledger 232 may have certain memory constraints. As such, these transactions are deleted or otherwise removed from the ledger when a certain amount of the immutable ledger 232 is available for data storage purposes. This is to ensure that transactions for which a determination is made that there is a consensus amongst a data provider and/or the data curators(s) are logged.

Figure 3:
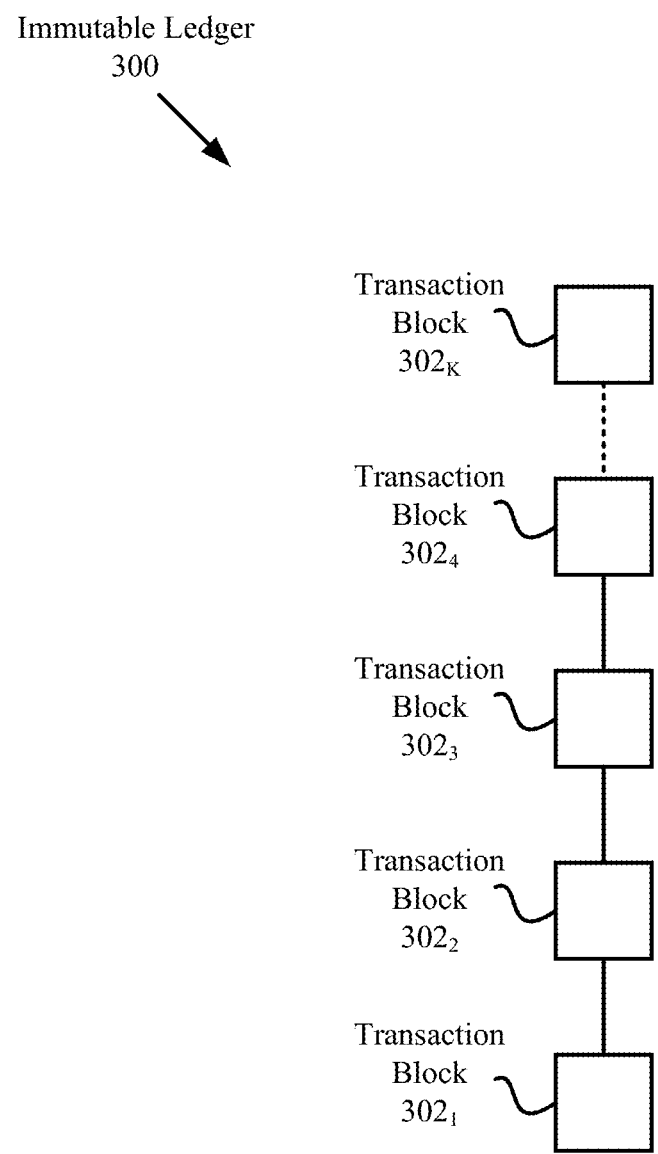
FIG. 3 provides an illustration of an illustrative immutable ledger.

In order to fully understand the novel immutable ledger logging technique of the present solution, the particulars of an illustrative immutable ledger will now be described in relation to FIGS. 3-4. As shown in FIG. 3, the immutable ledger 300 provides a digital ledger in which transactions made between (i) the data users and the data providers and (ii) the data providers and the data curators are recorded publicly, efficiently and in a verifiable and permanent way. The transactions can be logged in the same or different order than the order in which a request is received at the data providers and/or the order in which the request is accepted by the data providers.

The digital ledger is stored in a data store 230 of FIG. 2 as an immutable ledger 232. The immutable ledger 232 defines a cryptographically secure chain of transaction blocks $302_1$, $302_2$, $302_3$, . . . , $302_K$ (collectively referred to as "302"). Transaction block $302_1$ is chained or linked to transaction block $302_2$. Transaction block $302_2$ is chained to transaction block $302_1$ and transaction block $302_3$. Transaction block $302_3$ is chained to transaction block $302_2$ and transaction block $302_4$. Transaction block $302_4$ is chained to transaction block $302_3$ and transaction block $302_5$ (not shown), and so on.

Each transaction block provides a record of (i) transactions between the data users and the data providers that are associated with a respective request (e.g., transactions 208 and 226 of FIG. 2 or transactions 208 and 228 of FIG. 2) and (ii) transactions between the data providers and the data curators that are also associated with the respective request (e.g., request 208 of FIG. 2) (e.g., transactions 210, 212, 214, 216 of FIG. 2 or transactions 218, 220, 222, 224 of FIG. 2). For example, transaction block $302_1$ provides an immutable record for transactions 208, 226 between data user $202_2$ and data provider $204_1$, transactions 210, 212 between data provider $204_1$ and data curator $206_1$, and transactions 214, 216 between data provider $204_1$ and data curator $206_2$. Transaction block $302_2$ provides an immutable record for transactions 208, 228 between data user $202_2$ and data provider $204_3$, transactions 218, 220 between data provider $204_3$ and data curator $206_3$, and transactions 222, 224 between data provider $204_3$ and data curator $206_P$. The present solution is not limited to the particulars of this example.

Figure 4:
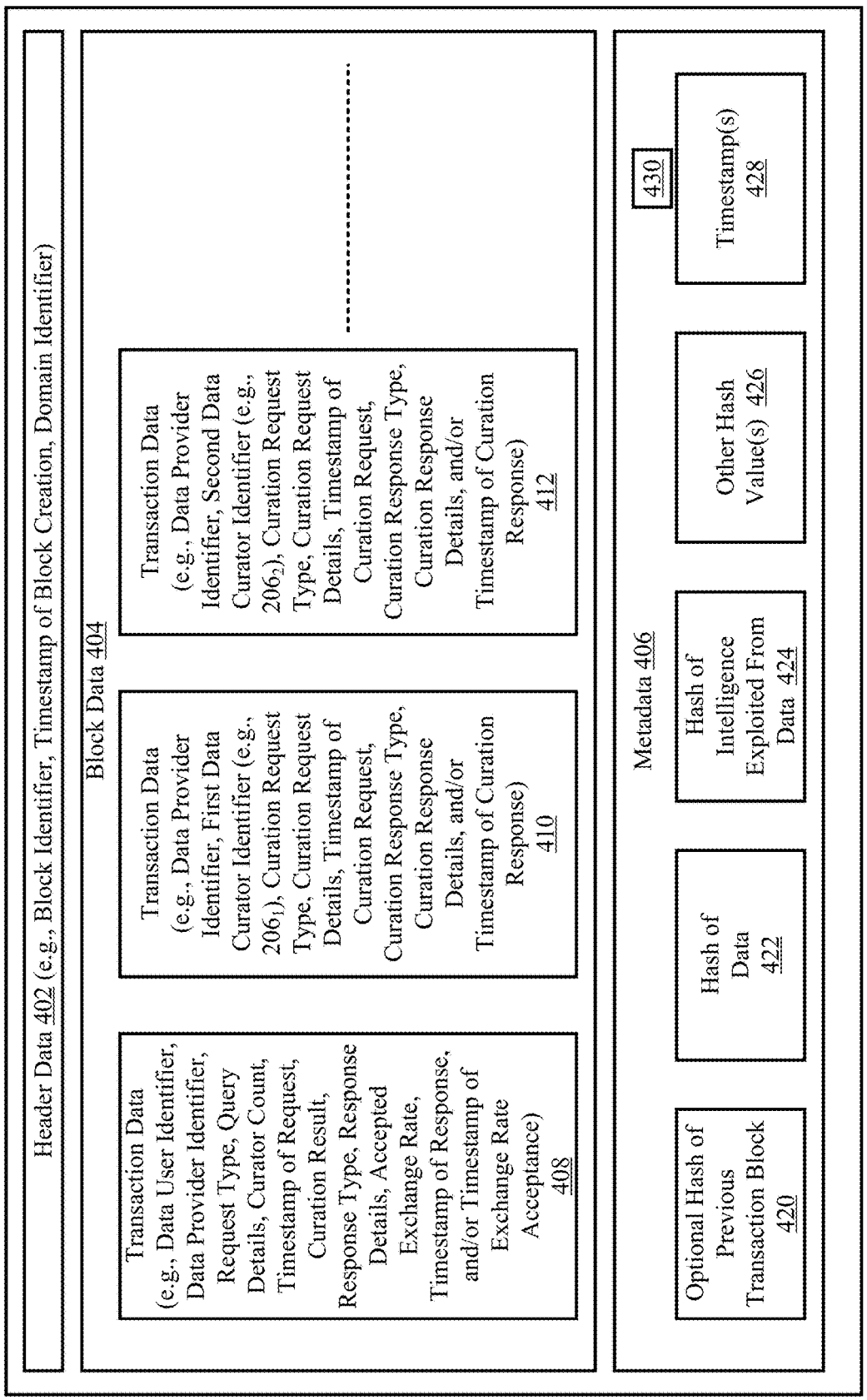
FIG. 4 provides an illustration of an illustrative transaction block.

Referring now to FIG. 4, there is provided an illustration of an illustrative architecture for a transaction block 400.

Each of the transaction blocks $302_1, 302_2, 302_3, \ldots, 302_K$ of FIG. 3 can be the same as or similar to transaction block 400. Thus, the discussion of transaction block 400 is sufficient for understanding transaction blocks $302_1, 302_2, 302_3, \ldots, 302_K$ of FIG. 3.

As shown in FIG. 4, transaction block 400 comprises header data 402, block data 404, and metadata 406. The header data 402 includes, but is not limited to, a block identifier, a timestamp of block creation, and/or a domain identifier (e.g., a space domain identifier or a geospatial domain identifier). The block identifier can include at least one letter, number and/or symbol. The metadata 406 comprises one or more hash values, timestamp(s) of hash value generation 428, and/or a cryptographic nonce 430. The hash values can include, but are not limited to, a hash of a previous transaction block 420, a hash of the data that was requested and/or curated 422, a hash of intelligence exploited from data (e.g., risk assessment results) 424, and/or other hash values 426 (e.g., hash of any type of data assessment results). Hash values and timestamps are well known in the art. Algorithms for generating hash values and timestamps are also well known in the art. Any known or to be known hash algorithm or method for generating a timestamp can be used herein without limitation to generate hash values 420-426 and timestamps. The cryptographic nonce 430 includes an arbitrary number that can be used just once so as to ensure that the transaction blocks cannot be altered retroactively without the alteration of all subsequent blocks and the consensus of the network.

The block data 404 includes transaction data 408 concerning the particulars of a transaction (e.g., transaction 208, 226 or transaction 208, 228 of FIG. 2) between a data user (e.g., data user $202_2$ of FIG. 2) and a data provider (e.g., data user $204_1$ or data user $204_3$ of FIG. 2) that is associated with a respective request (e.g., request 208 of FIG. 2). The transaction data 408 may include, but is not limited to, a data user identifier, a data provider identifier, a request type, query details, a curator count, timestamp(s) of the request (e.g., a time of generation, transmission and/or reception), a curation result, a response type, response details, an accepted exchange rate (e.g., 0.01), timestamp(s) of the response (e.g., a time of generation, transmission and/or response), and/or a timestamp of exchange rate acceptance. Each of the data user identifier and the data provider identifier can include at least one letter, number and/or symbol. The request type can include, but is not limited to, an observation request type, a Resident Space Object ("RSO") observation type, an aircraft observation type, a geospatial intelligence data type, a top secret object type, a classified object type, an unclassified object type, a sensitive data type, a public data type, a risk assessment data type, a vehicle control data type, and/or a collision avoidance data type. The query details can include, but are not limited to, the type of information being requested, a source identifier for observation information, a start date/time for observation data collection, an end date/time for observation data collection, and a data format. The curator count specifies a total number of curations that are to be performed in relation to the observation information (e.g., three curations). The collective curation result specifies whether there was or was not a consensus amongst the data provider and/or the data curator(s) that the observation information is associated with the given object. The response type can include, but is not limited to, an observation data response and/or a risk assessment response. The response details can include, but are not limited to, the type of information provided to the data user (e.g., observation data, a permission to access observation data, a risk assessment result, and/or a command for controlling operations of the data user), and/or permission/instructions how to access and/or download observation data).

An illustrative format for the transaction data 408 is provided below. The present solution is not limited to the particulars of this format.

```
{
userID: "User123",
providerID: "CompanyA",
curatorIDs: "CompanyB",
curatorRequestCount: 1,
requestType: "RSO_Observations",
queryDetails: "Provide observations on RSO NORAD ID: 26824 from startDate: "2020-04-
10T00:00:00.000Z"to endDate: "2021-04-10T00:00:00.000Z". All observation in b3 format",
format: "b3",
requestTimeStart: "2020-04-10T00:00:00.000Z",
requestTimeEnd: "2021-04-10T00:00:00.000Z",
providerExchangeRate: "0.01",
accepted: True
}
```

The block data 404 also includes transaction data 410, 412 concerning the particulars of a transaction between the data provider and at least one data curator (e.g., data curator $206_1$, $206_3$, $206_3$, or $206_P$ of FIG. 2) that is also associated with the respective request. Each set of transaction data 410, 412 includes, but is not limited to, a data provider identifier, a data curator identifier, a curation request type, curation request details, curation response type, curation response details, and/or timestamp of curation response (e.g., time of curation response generation, transmission and/or reception). The curation request type includes, but is not limited to, a Resident Space Object ("RSO") observation data curation type, an aircraft observation curation type, and/or a geospatial intelligence data curation type. The curation request details include, but are not limited to, the observation data that is to be curated, instructions how to access the observation data that is to be curated, permission(s) to access the observation data that is to be curated, a specified period of time in which the data curator is permitted to access the observation data, a type of technique to be used in curating the observation data (e.g., an estimation algorithm, a Bayesian filter, and/or a machine learning algorithm), and a curation response data format. The curation response details include, but are not limited to, a curation result (e.g., a level of accuracy and precision value), an indication as to whether the curation result exceeds a threshold value, an indication as to whether the curation process was successful/unsuccessful, and/or an indication as to whether an error occurred during the curation process.

As noted above, the present solution can be used in relation to multiple domains, namely a space domain, an airspace domain, and/or a geospatial intelligence domain. Transactions in both domains can be included in a single immutable ledger or different instances of an immutable ledger.

Figure 6:
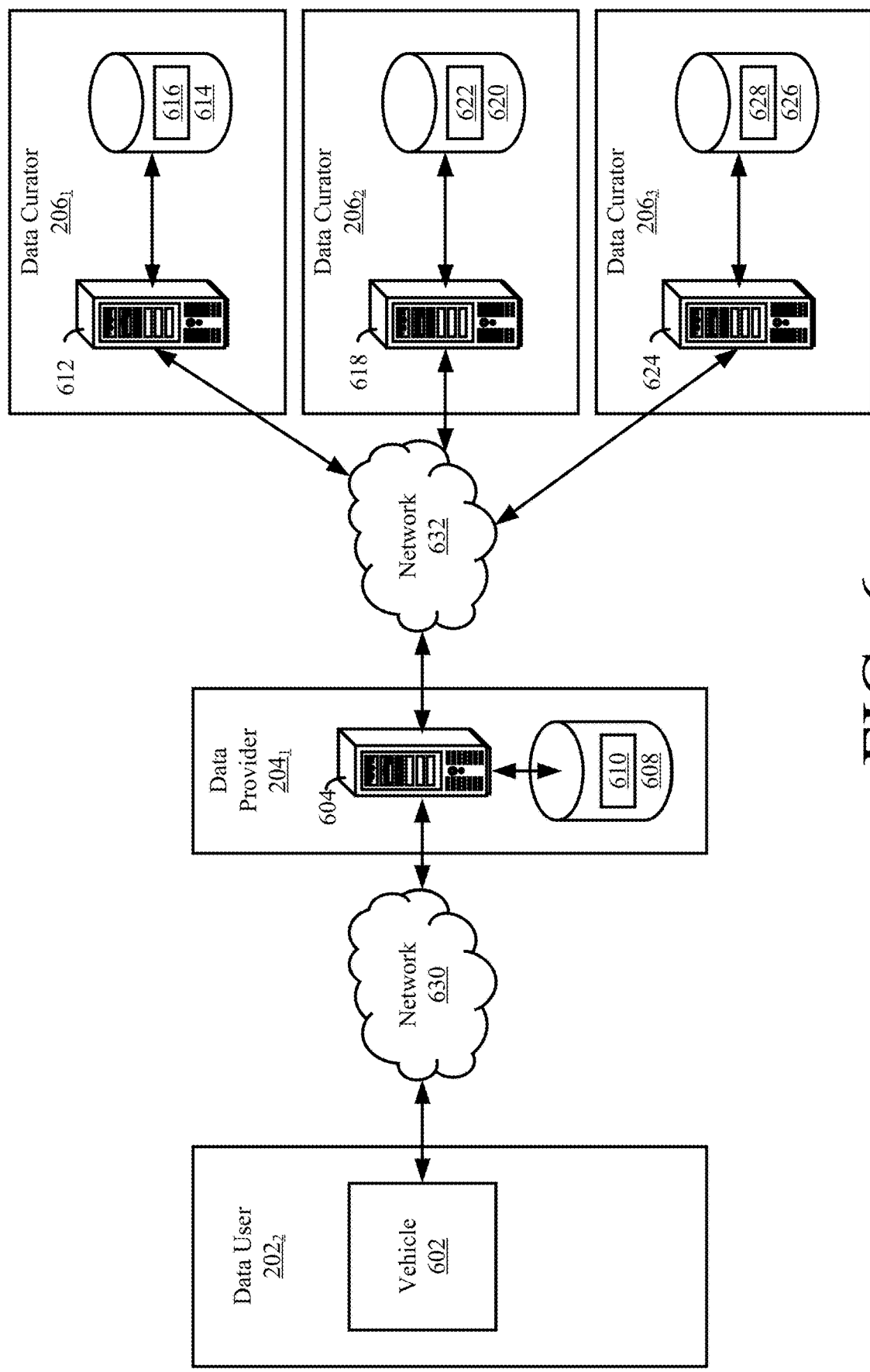
FIG. 6 provides an illustration that is useful for understanding illustrative architectures for data user(s), data provider(s) and/or data curator(s).

Referring now to FIG. 6, there is provided an illustration that is useful for understanding an illustrative architecture for the data user(s), data provider(s) and/or data curator(s). As shown in FIG. 6, the data user $202_2$ may comprise a vehicle 602. The present solution is not limited in this regard. The data user $202_2$ may alternatively comprise a vessel, a personal computer, a smart phone, a robot, and/or other device with computing functionality. The vehicle 602 can include, but is not limited to, a car, a truck, a plane, a boat, a satellite, a robot, and/or an unmanned vehicle. The vehicle 602 is configured to communicate with the data provider $204_1$ via a network 630. The network 630 can include, but is not limited to, a cellular network, a satellite communications network, Internet and/or Intranet. The data provider $204_1$ comprises a computing device 604 and a data store 608 on which data 610 is stored. The data provider $204_1$ is configured to communicate with data curators $206_1$, $206_2$, $206_3$ via a network 632. The network 632 can include, but is not limited to, a cellular network, a satellite communications network, Internet and/or Intranet. Data curator $206_1$ comprises a computing device 612 and a data store 614 on which information 616 is stored. The information 616 can include, but is not limited to, an algorithm for curating data (e.g., an estimation algorithm, a Bayesian filter based algorithm, and/or a machine learning algorithm). Data curator $206_2$ comprises a computing device 618 and a data store 620 on which information 622 is stored. The information 622 can include, but is not limited to, an algorithm for curating data (e.g., an estimation algorithm, a Bayesian filter based algorithm, and/or a machine learning algorithm). Data curator $206_3$ comprises a computing device 624 and a data store 626 on which information 628 is stored. The information 628 can include, but is not limited to, an algorithm for curating data (e.g., an estimation algorithm, a Bayesian filter based algorithm, and/or a machine learning algorithm).

Figure 7:
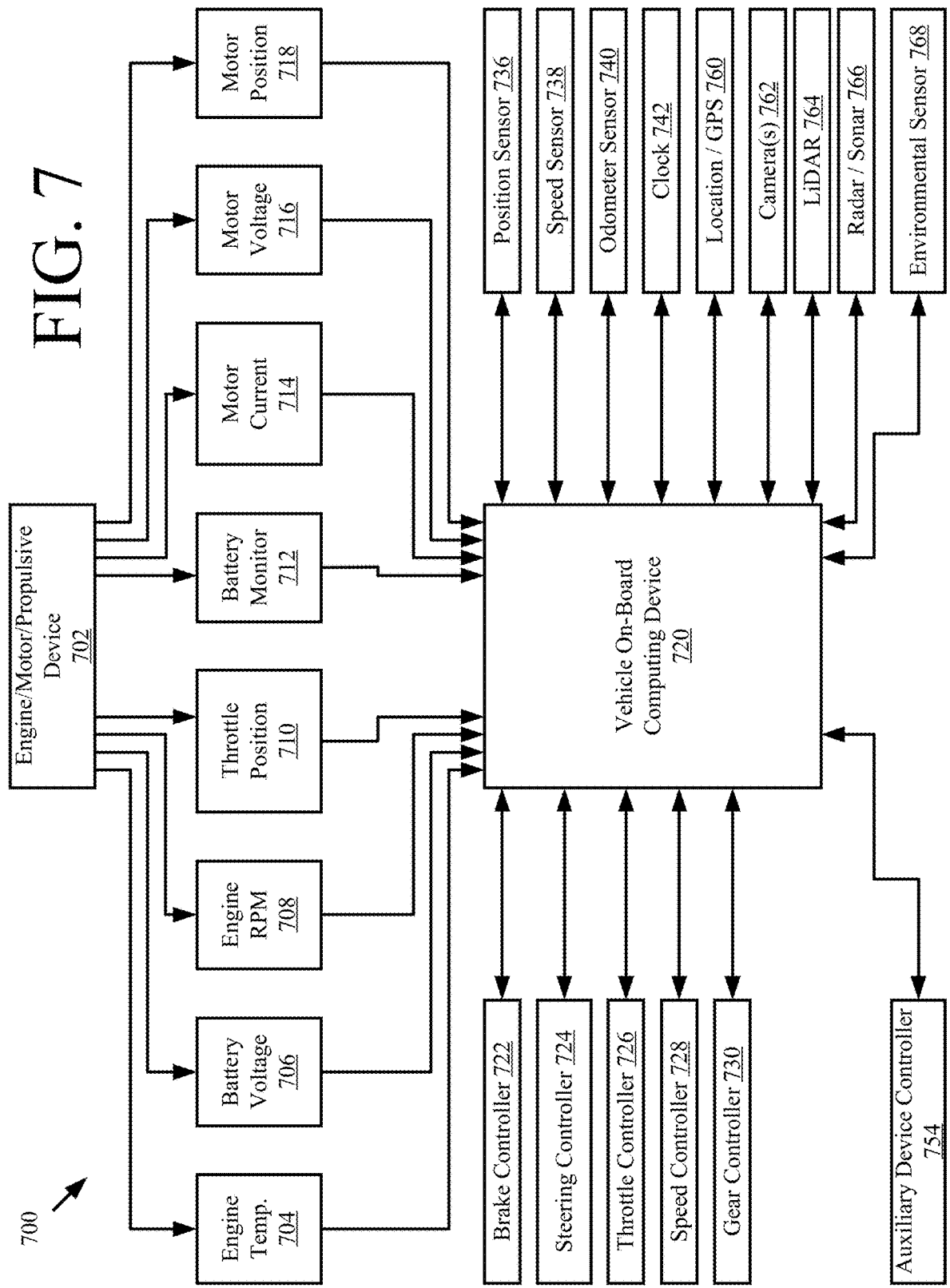
FIG. 7 provides an illustration of an illustrative architecture for a vehicle.

Referring now to FIG. 7, there is provided an illustration of an illustrative system architecture 700 for a vehicle. Vehicle 602 of FIG. 6 can have the same or similar system architecture as that shown in FIG. 7. Thus, the following discussion of system architecture 700 is sufficient for understanding vehicle 602 FIG. 6.

As shown in FIG. 7, the vehicle 700 includes an engine, motor or propulsive device (e.g., a thruster) 702 and various sensors 704-718 for measuring various parameters of the vehicle. In gas-powered or hybrid vehicles having a fuel-powered engine, the sensors may include, for example, an engine temperature sensor 704, a battery voltage sensor 706, an engine Rotations Per Minute ("RPM") sensor 708, and/or a throttle position sensor 710. If the vehicle is an electric or hybrid vehicle, then the vehicle may have an electric motor, and accordingly will have sensors such as a battery monitoring system 712 (to measure current, voltage and/or temperature of the battery), motor current 714 and voltage 716 sensors, and motor position sensors such as resolvers and encoders 718.

Operational parameter sensors that are common to both types of vehicles include, for example: a position sensor 736 such as an accelerometer, gyroscope and/or inertial measurement unit; a speed sensor 738; and/or an odometer sensor 740. The vehicle also may have a clock 742 that the system uses to determine vehicle time during operation. The clock 742 may be encoded into the vehicle on-board computing device, it may be a separate device, or multiple clocks may be available.

The vehicle also will include various sensors that operate to gather information about the environment in which the vehicle is traveling. These sensors may include, for example: a location sensor 760 (e.g., a Global Positioning System ("GPS") device); object detection sensors such as one or more cameras 762; a LiDAR sensor system 764; and/or a radar and/or a sonar system 766. The sensors also may include environmental sensors 768 such as a precipitation sensor and/or ambient temperature sensor. The object detection sensors may enable the vehicle to detect objects that are within a given distance range of the vehicle 700 in any direction, while the environmental sensors collect data about environmental conditions within the vehicle's area of travel.

During operations, information is communicated from the sensors to an on-board computing device 720. The on-board computing device 720 analyzes the data captured by the sensors and/or data received from data providers, and optionally controls operations of the vehicle based on results of the analysis. For example, the on-board computing device 720 may control: braking via a brake controller 732; direction via a steering controller 724; speed and acceleration via a throttle controller 726 (in a gas-powered vehicle) or a motor speed controller 728 (such as a current level controller in an electric vehicle); a differential gear controller 730 (in vehicles with transmissions); and/or other controllers.

Geographic location information may be communicated from the location sensor 760 to the on-board computing device 720, which may then access a map of the environment that corresponds to the location information to determine known fixed features of the environment such as streets, buildings, stop signs and/or stop/go signals. Captured images from the cameras 762 and/or object detection information captured from sensors such as LiDAR 764 is communicated from those sensors to the on-board computing device 720. The object detection information and/or captured images are processed by the on-board computing device 720 to detect objects in proximity to the vehicle 700. Any known or to be known technique for making an object detection based on sensor data and/or captured images can be used in the embodiments disclosed in this document.

When the on-board computing device 720 detects a moving object, the on-board computing device 720 will generate one or more possible object trajectories for the detected object, and use the possible object trajectories to determine a vehicle trajectory for the AV. Additionally or alternatively, the on-board computing device 720 generates and sends a request for curated information about the detected object to data provider(s) (e.g., data provider(s) $204_1, \ldots, 204_M$ of FIG. 2). The curated information may then be used by the on-board computing device 720: to generate one or more possible object trajectories for the detected object; and/or to determine a vehicle trajectory for the vehicle (e.g., in accordance with commands contained in the curated information). The on-board computing device 720 then performs operations to cause the AV to follow the defined vehicle trajectory or otherwise maneuver.

Figure 8:
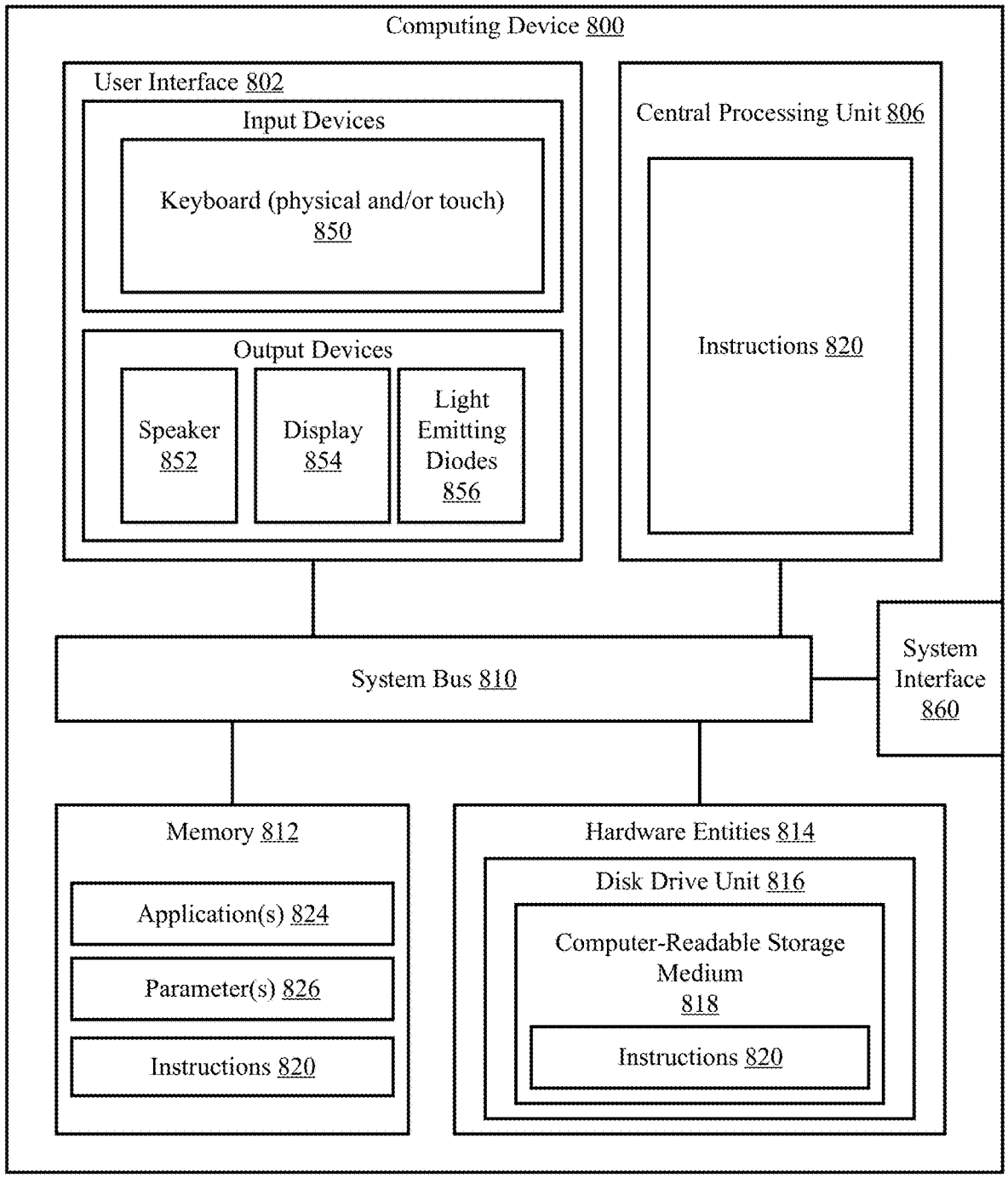
FIG. 8 provides an illustration of an illustrative architecture for a computing device.

Referring now to FIG. 8, there is provided an illustration of an illustrative architecture for a computing device 800. The computing device 112 of FIG. 1, computing devices 604, 612, 618, 624 of FIG. 6 and/or the vehicle on-board computing device 720 of FIG. 7 is/are the same as or similar to computing device 800. As such, the discussion of computing device 800 is sufficient for understanding the computing devices 112, 604, 612, 618, 624, 720 of FIG. 1 and the vehicle on-board computing device 220 of FIG. 2.

Computing device 800 may include more or less components than those shown in FIG. 8. However, the components shown are sufficient to disclose an illustrative solution implementing the present solution. The hardware architecture of FIG. 8 represents one implementation of a representative computing device configured to operate a vehicle, as described herein. As such, the computing device 800 of FIG. 8 implements at least a portion of the method(s) described herein.

Some or all components of the computing device 800 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 8, the computing device 800 comprises a user interface 802, a Central Processing Unit ("CPU") 806, a system bus 810, a memory 812 connected to and accessible by other portions of computing device 800 through system bus 810, a system interface 860, and hardware entities 814 connected to system bus 810. The user interface can include input devices and output devices, which facilitate user-software interactions for controlling operations of the computing device 800. The input devices include, but are not limited to, a physical and/or touch keyboard 850. The input devices can be connected to the computing device 800 via a wired or wireless connection (e.g., a Bluetooth® connection). The output devices include, but are not limited to, a speaker 852, a display 854, and/or light emitting diodes 856. System interface 860 is configured to facilitate wired or wireless communications to and from external devices (e.g., network nodes such as access points, etc.).

At least some of the hardware entities 814 perform actions involving access to and use of memory 812, which can be a Random Access Memory ("RAM"), a disk drive, flash memory, a Compact Disc Read Only Memory ("CD-ROM") and/or another hardware device that is capable of storing instructions and data. Hardware entities 814 can include a disk drive unit 816 comprising a computer-readable storage medium 818 on which is stored one or more sets of instructions 820 (e.g., software code) configured to implement one or more of the methodologies, procedures, or functions described herein. The instructions 820 can also reside, completely or at least partially, within the memory 812 and/or within the CPU 806 during execution thereof by the computing device 800. The memory 812 and the CPU 806 also can constitute machine-readable media. The term "machine-readable media", as used here, refers to a single medium or multiple media (e.g., a centralized or distributed database, and/or associated caches and servers) that store the one or more sets of instructions 820. The term "machine-readable media", as used here, also refers to any medium that is capable of storing, encoding or carrying a set of instructions 820 for execution by the computing device 800 and that cause the computing device 800 to perform any one or more of the methodologies of the present disclosure.

Figure 9:
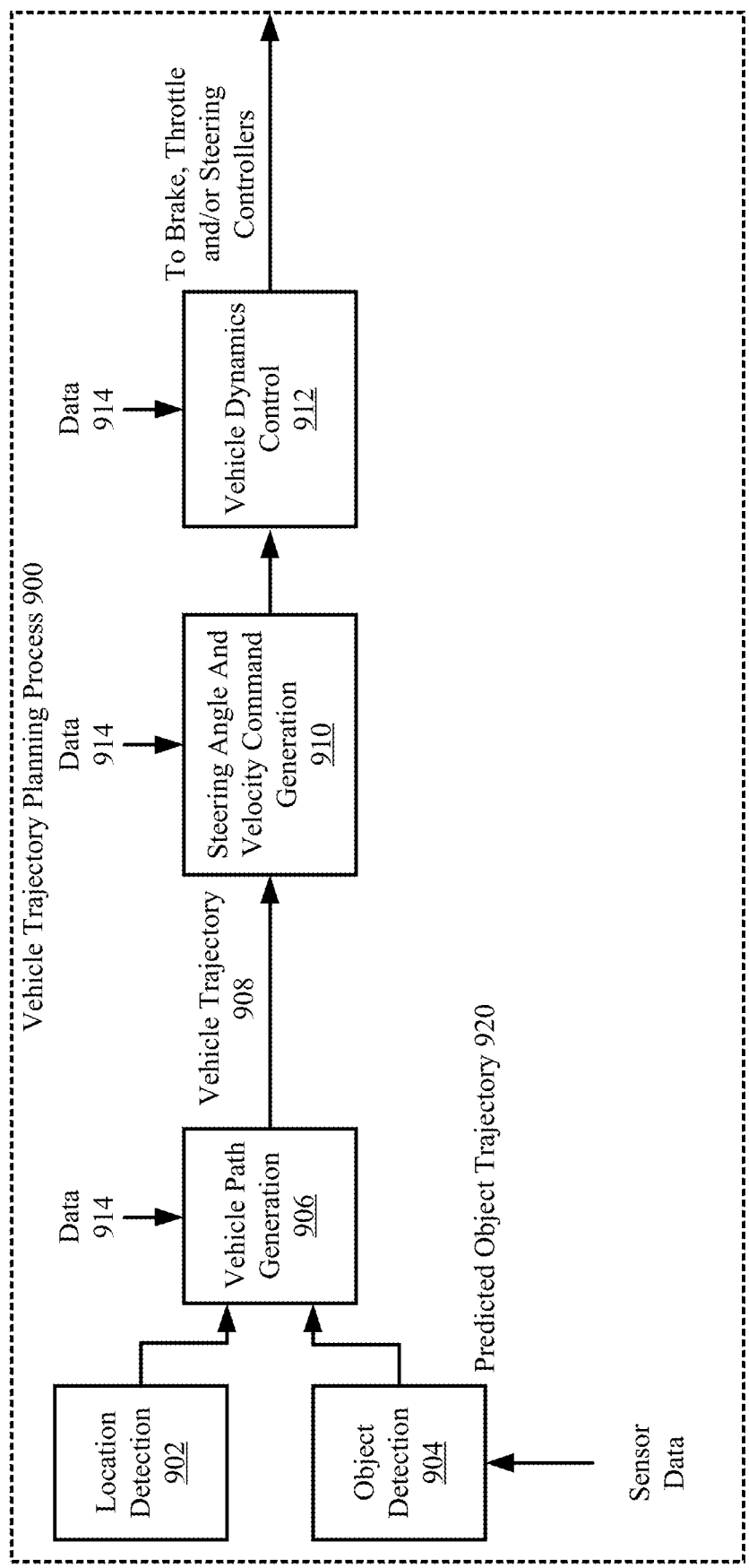
FIG. 9 provides a block diagram of an illustrative vehicle trajectory planning process.

Referring now to FIG. 9, there is provided a block diagram that is useful for understanding how movement of a vehicle (e.g., vehicle 602 of FIG. 6 and/or vehicle 700 of FIG. 7) may be achieved in accordance with the present solution. All of the operations performed in blocks 902-912 can be performed by the on-board computing device of the vehicle.

In block 902, a location of the vehicle is detected. This detection can be made based on sensor data output from a location sensor (e.g., location sensor 760 of FIG. 7) of the vehicle. This sensor data can include, but is not limited to, GPS data. The detected location of the vehicle is then passed to block 906.

In block 904, an object (e.g., another vehicle, an asteroid, etc.) is detected within proximity of the vehicle (e.g., <500+ meters). This detection is made based on sensor data output from a camera (e.g., camera 762 of FIG. 7) of the vehicle and/or a LiDAR system (e.g., LiDAR system 764 of FIG. 7) of the vehicle. For example, image processing is performed to detect an instance of an object of a certain class (e.g., a vehicle or asteroid) in an image. The image processing/object detection can be achieved in accordance with any known or to be known image processing/object detection algorithm.

Additionally, a predicted trajectory may optionally be determined by the vehicle in block 904 for the object. Techniques for predicting object trajectories are well known in the art. Any known or to be known technique for predicting object trajectories can be used herein without limitation. Information 920 specifying the object's predicted trajectory may optionally be provided to block 906. In some scenarios, a classification of the object is also passed to block 906.

In block 906, a vehicle trajectory is generated using the information from blocks 902, 904, and/or data 914 received from data provider(s) (e.g., data provider(s) $204_1, \ldots, 204_M$ of FIG. 2). Techniques for determining a vehicle trajectory are well known in the art. Any known or to be known technique for determining a vehicle trajectory can be used herein without limitation. The vehicle trajectory 908 is then provided to block 910.

In block 910, a steering angle and velocity command is generated based on the vehicle trajectory 908 and/or data 914 received from data provider(s) (e.g., data provider(s) $204_1, \ldots, 204_M$ of FIG. 2). The steering angle and velocity command is provided to block 912 for vehicle dynamics control, i.e., the steering angle and velocity command causes the vehicle to follow the vehicle trajectory 908. In some cases, the steering angle and velocity command are generated by the data provider(s) and communicated to the vehicle as data 914. Accordingly, operations of block 902, 904, 906, 910 may be optional in some scenarios (e.g., teleoperation scenario s).

Illustrative Methods

Figure 10A:
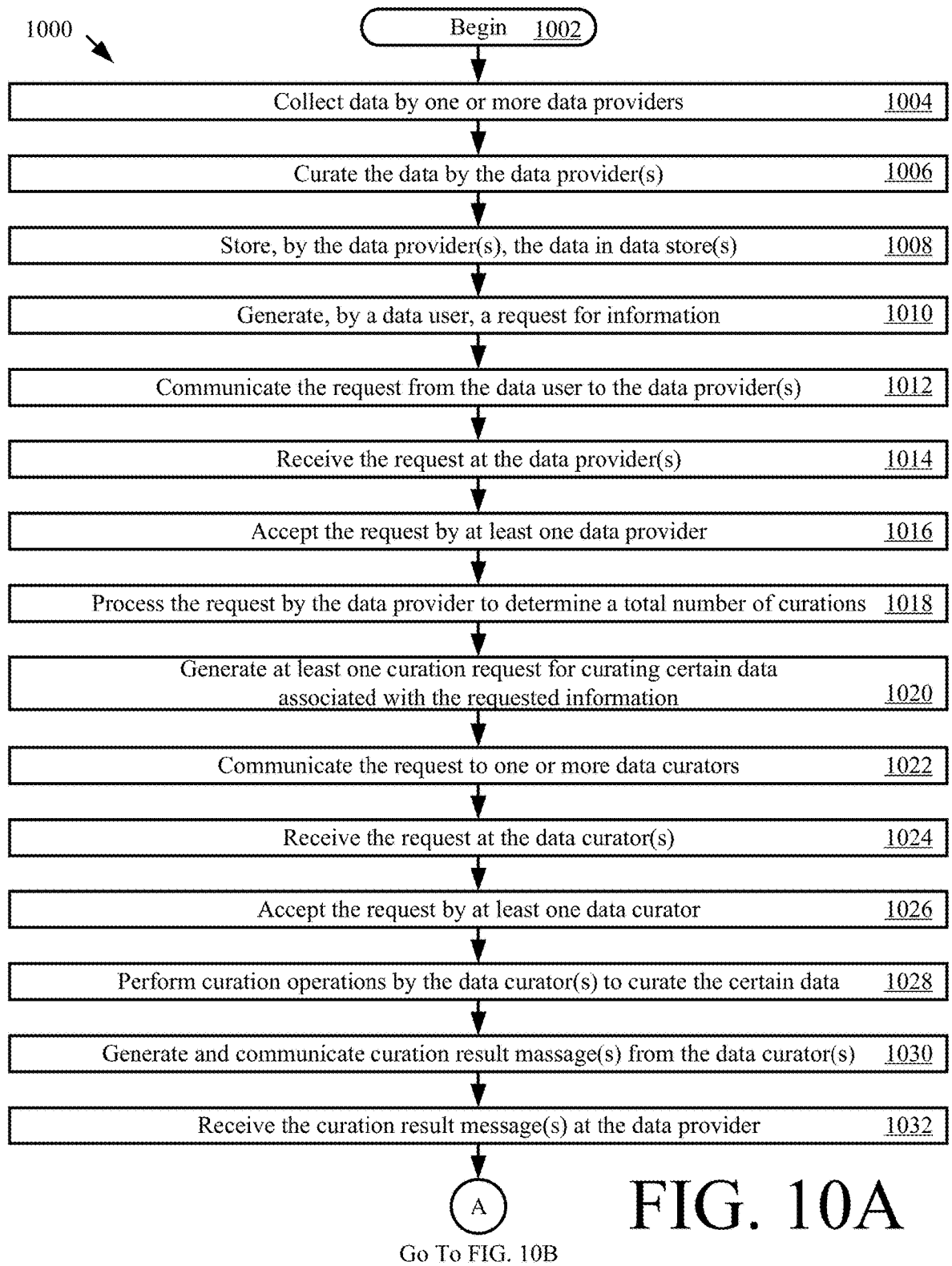

Referring now to FIG. 10, there is provided an illustrative method 1000 for multi-domain (e.g., space, airspace and/or geospatial intelligence) data processing using an immutable ledger. Method 1000 implements a novel approach to organizing multi-domain data requests onto an immutable ledger such that, once consensus is established, transactions related to a request, corresponding data provision(s) and corresponding data curation(s) are captured in a transaction block.

Method 1000 begins with 1002 and continues with 1004 where data (e.g., data 116 of FIG. 1 and/or data 610, 616, 622, 628 of FIG. 6) is collected by one more data providers (e.g., data provider $204_1, 204_2, 204_3, \ldots$, and/or $204_M$ of FIG. 2). The data can include, but is not limited to, observation data generated by one or more sensors (e.g., sensor(s) 106 of FIG. 1). Next in 1006, the data provider(s) determines that the data meets a level of accuracy and precision. This determination can be achieved using a known or to be known technique such as an estimation technique, a Bayesian filter technique and/or a machine learning technique. Once the data and/or data/object association has been curated, the data provider(s) store(s) the data in one or more data stores (e.g., data store 114 of FIG. 1, and/or data store 614, 620, 626 of FIG. 6). The data may be stored so as to be associated with the object.

Thereafter in 1010, a data user (e.g., data user $202_1$, $202_2$, $202_3$ or $202_N$ of FIG. 2) generates a request for information (e.g., request 208 of FIG. 1). In some scenarios, the information is associated with the given object (e.g., object 102 of FIG. 1). The request is communicated to the data provider(s) in 1012 (e.g., over network 630 of FIG. 6). The data provider(s) receive(s) the request in 1014. In 1016, at least one data provider (e.g., data provider $204_1$ and/or $204_3$ of FIG. 2) accepts the request.

Upon acceptance of the request, the data provider processes the request to determine a total number of curations, as shown by 1018. Thereafter in 1020, the data provider generates at least one curation request for curating certain data associated with the requested information (e.g., curation request 210 and/or 214 of FIG. 2, or curation request 218 and/or 222 of FIG. 2). The curation request is then communicated to one or more data curators (e.g., data curator $206_1$, $206_2$, $206_3$, . . . , and/or $206_P$ of FIG. 2) (e.g., over network 632 of FIG. 6). In 1024, the curation request is received by the data curator(s). In 1026, at least one data curator accepts the curation request.

Upon acceptance of the curation request, the data curator performs curation operations in 1028 to determine that the certain data meets a level of accuracy and precision. In some scenarios, the data curator determines that the certain data is associated with the given object within a certain level of accuracy and precision. This determination can be achieved using a known or to be known technique such as an estimation technique, a Bayesian filter technique and/or a machine learning technique. When the curation operations are completed, the data curator generates a curation result message (e.g., curation result message 212, 216, 220 or 224 of FIG. 2) as shown by 1030. The curation result message is communicated from the data curator to the data provider. In 1032, the curation results message is received at the data provider. Thereafter, method 1000 continues with 1034 of FIG. 10B.

As shown in FIG. 10B, 1034 involves processing the curation result message(s) to determine if there is a consensus that the certain data meets a level of accuracy and precision. In some scenarios, a consensus is determined to exist when all of the data curator(s) determine that the certain data meets a level of accuracy and precision. In other scenarios, a consensus is determined to exits when a threshold percentage of the data curator(s) determine that the certain data meets a level of accuracy and precision. The present solution is not limited to the particulars of these scenarios.

If a determination is made that a consensus does not exist [1036:NO], method 1000 continues with 1038 where the data user is notified of the same. In some scenarios, a transaction block (e.g., transaction block $302_1$, $302_2$, $302_3$, $302_4$, . . . , or $302_K$ of FIG. 3) in an immutable ledger (e.g., immutable ledger 300 of FIG. 3) is created and/or populated. Method 1000 then continues with 1064 where it ends or other operations are performed (e.g., return to 1002 of FIG. 10A or provide the data user with the requested information if the data user indicated that it will accept un-curated information).

If a determination is made that a consensus does exist [1036:YES], method 1000 continues with 1040 where a transaction block (e.g., transaction block $302_1$, $302_2$, $302_3$, $302_4$, . . . , or $302_K$ of FIG. 3) in an immutable ledger (e.g., immutable ledger 300 of FIG. 3) is created. The transaction block is at least partially populated in 1042 with transaction data (e.g., transaction data 408, 410 and/or 412 of FIG. 4) and/or metadata (e.g., metadata 406 of FIG. 4).

In some scenarios, the certain data is processed by the data provider as requested by the data user, as shown by 1044. This processing can be performed for risk assessment purposes and/or collision avoidance purposes. This processing may produce commands for controlling operations of the data user (e.g., a steering angle command and/or a velocity command for controlling a vehicle in a tele-operated manner).

In 1046, the data provider obtains a monetary exchange rate (0.01). The monetary exchange rate may be pre-defined or dynamically determined/selected/computed by the data provider. The monetary exchange rate can be dynamically determined, selected or computed based (a) whether or not there was a consensus, (b) the type of information being requested, (c) a classification level of the information being requested (e.g., top secret, classified, unclassified, sensitive, public, etc.), and/or (d) the exchange rates currently being offered by other data providers for the same or similar information.

A response message (e.g., response message 226 or 228 of FIG. 2) is generated by the data provider in 1048. The response message includes the monetary exchange rate. The response message may also include the requested information or permission/instructions for accessing the information. The response message is communicated from the data provider to the data user in 1050.

In some scenarios, the data user may need to accept the monetary exchange rate prior to being provided access to the requested information. Accordingly, method 1000 includes optional operations 1052-1058. In optional 1052, a determination is made as to whether or not the data user accepts the monetary exchange rate. If not [1052:NO], then 1054 is performed where method 1000 ends or other operations are performed (e.g., return to 1002 of FIG. 10A). If so [1052: YES], then the data provider generates a message including the requested information or permission/instructions for accessing the requested information. The message is communicated from the data provider to the data user in 1058.

In 1060, population of the transaction block is completed. For example, transaction data specifying the monetary exchange rate and/or data indication whether the monetary exchange was accepted or rejected by the data user is added to the transaction block.

In optional 1062, the requested information is used to control operations of the data user. The requested information may be used to cause the data user to perform a vehicle or vessel maneuver. For example, the requested information includes commands for controlling a thruster of a tele-operated space craft or commands for controlling a braking, steering, and/or throttle of a tele-operated vehicle. The space craft or tele-operated vehicle execute the commands which cause the same to travel along a given trajectory (e.g., in which a collision with the given object is avoided). In other scenarios, the requested information is used by an autonomous vehicle to predict the given object's trajectory (e.g., predicted object trajectory 920 of FIG. 9), determine a vehicle trajectory (e.g., vehicle trajectory 908 of FIG. 9), and/or generate a steering angle and velocity command. The autonomous vehicle then executes the steering angle and velocity command which causes the autonomous vehicle to travel along a given trajectory (e.g., in which a collision with the given object is avoided). Subsequently, 1064 is performed where method 1000 ends or other operations are performed (e.g., return to 1002 of FIG. 10A).

The described features, advantages and characteristics disclosed herein may be combined in any suitable manner. One skilled in the relevant art will recognize, in light of the description herein, that the disclosed systems and/or methods can be practiced without one or more of the specific features. In other instances, additional features and advantages may be recognized in certain scenarios that may not be present in all instances.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

Although the systems and methods have been illustrated and described with respect to one or more implementations, equivalent alterations and modifications will occur to others skilled in the art upon the reading and understanding of this specification and the annexed drawings. In addition, while a particular feature may have been disclosed with respect to only one of several implementations, such feature may be combined with one or more other features of the other implementations as may be desired and advantageous for any given or particular application. Thus, the breadth and scope of the disclosure herein should not be limited by any of the above descriptions. Rather, the scope of the invention should be defined in accordance with the following claims and their equivalents.

We claim:

1. A method for multi-domain consensus using an immutable ledger, comprising:
    receiving, by a first computing device of a data provider, a first information request for information from a second computing device of a first data user, the information request including a data user defined value for a variable total number of data curations that can be performed for certain data, the data user defined value being different than a value defined by another second data user in a second information request for information associated with the certain data;
    communicating a first curation request from the first computing device to a third computing device of a first data curator and second curation request from the first computing device a fourth computing device of a second data curator, wherein the first data curator and the second data curator are entities independent from the data provider and employ different curation techniques;
    receiving, by the first computing device, a first curation result message from the third computing device and a second curation result message from the fourth computing device, the first and second curation result messages indicating whether the first or second data curator determined that the certain data meets a level of accuracy and precision;
    determining, by the first computing device, whether a threshold number of data curators determined that the certain data meets the level of accuracy and precision, the threshold number being set by the first data user and being different than a value set by the another second data user; and
    responsive to a determination that the threshold number of data curators did determine that the certain data meets the level of accuracy and precision, creating a transaction block in the immutable ledger stored in a first data store, and providing the data user access to the information associated with the certain data.

2. The method according to claim 1, further comprising performing curation operations by the first computing device of the data provider to determine that the certain data specifies second information meets a level of accuracy and precision prior to storage of the certain data in a second data store.

3. The method according to claim 1, wherein the transaction block is created in the immutable ledger in response to a user-software interaction by the data user to accept a current value of a variable exchange rate in addition to the determination that the threshold number of data curators did determine that the certain data meets the level of accuracy and precision.

4. The method according to claim 1, further comprising populating the transaction block with block data for (i) a transaction between the first computing device and the second computing device, (ii) a transaction between the first computing device and the third computing device, and (iii) a transaction between the first computing device and the fourth computing device.

5. The method according to claim 1, further comprising populating the transaction block with data identifying a space domain, an airspace domain or a geospatial intelligence domain.

6. The method according to claim 1, further comprising populating the transaction block with a hash for the certain data or a hash of results from intelligence exploited from the certain data.

7. The method according to claim 1, further comprising selecting, by the first computing device, a monetary exchange rate based on the type of information being requested or a classification level of the information being requested.

8. The method according to claim 1, further comprising selecting a first monetary exchange rate when the determination is made that the threshold number of data curators did determine that the certain data meets the level of accuracy and precision, and selecting a second different monetary exchange rate when a determination is made that the threshold number of data curators did not determine that the certain data meets the level of accuracy and precision.

9. The method according to claim 1, further comprising populating the transaction block with a monetary exchange rate for accessing the information being requested by the data user.

10. The method according to claim 1, further comprising using the information associated with the given object to cause the data user to exercise command and control of a vehicle or vessel.

11. A system, comprising:
    a processor; and
    a non-transitory computer-readable storage medium comprising programming instructions that are configured to cause the processor to implement a method for multi-domain consensus using an immutable ledger, wherein the programming instructions comprise instructions to:
        receive a first information request for information from a first computing device of a first data user, the information request including a data user defined value for a variable total number of data curations that can be performed for certain data, the data user defined value being different than a value defined by another second data user in a second information request for information associated with the certain data;

communicate a first curation request to a second computing device of a first data curator and a second curation request to a third computing device of a second data curator, wherein the first data curator and the second data curator employ different curation techniques;

receive a first curation result message indicating whether the first data curator determined that the certain data specifies information that meets a level of accuracy and precision and a second curation result message indicating whether the second data curator determined that the certain data specifies information the meets a level of accuracy and precision;

determine whether a threshold number of data curators determined that the certain data meets the level of accuracy and precision, the threshold number being set by the first data user and being different than a value set by the another second data user; and responsive to a determination that the threshold number of data curators did determine that the certain data meets the level of accuracy and precision, create a transaction block in the immutable ledger stored in a first data store, and provide the data user access to the information associated with the certain data.

12. The system according to claim 11, wherein the programming instructions further comprise instructions to determine that the certain data meets a level of accuracy and precision prior to storage of the certain data in a second data store.

13. The system according to claim 11, wherein the transaction block is created in the immutable ledger in response to the data user's acceptance of a current value of a variable exchange rate in addition to the determination that the threshold number of curators did determine that the certain data meets the level of accuracy and precision.

14. The system according to claim 11, wherein the programming instructions further comprise instructions to populate the transaction block with block data for (i) a transaction between the first computing device that is associated with the first information request and a fourth computing device associated with a response to the first information request, (ii) a transaction between the second computing device and the fourth, and (iii) a transaction between the third computing device and the fourth computing device.

15. The system according to claim 11, wherein the programming instructions further comprise instructions to populate the transaction block with data identifying a space domain, an air space domain, or a geospatial intelligence domain.

16. The system according to claim 11, wherein the programming instructions further comprise instructions to populate the transaction block with a hash for the certain data or a hash of results from intelligence exploited from the certain data.

17. The system according to claim 11, wherein the programming instructions further comprise instructions to select a monetary exchange rate based on the type of information being requested or a classification level of the information being requested.

18. The system according to claim 11, wherein the programming instructions further comprise instructions to select a first monetary exchange rate when the determination is made that the threshold number of curators did determine that the certain data meets the level of accuracy and precision, and selecting a second different monetary exchange rate when a determination is made that the threshold number of data curators did not determine that the certain data meets the level of accuracy and precision.

19. The system according to claim 11, wherein the programming instructions further comprise instructions to populate the transaction block with a monetary exchange rate for accessing the information being requested by the data user.

20. The system according to claim 11, wherein the programming instructions further comprise instructions to use the information associated with the given object to cause the data user to exercise command and control of a vehicle or vessel.

* * * * *